United States Patent
Redding et al.

(10) Patent No.: US 9,668,294 B2
(45) Date of Patent: May 30, 2017

(54) METHOD AND APPARATUS FOR BLUETOOTH LOW ENERGY SUSPEND AND RESUME

(71) Applicant: QUALCOMM Incorporated, San Diego, CA (US)

(72) Inventors: Brian Arnold Redding, Urbana, IL (US); Joel Benjamin Linsky, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 7 days.

(21) Appl. No.: 14/334,487

(22) Filed: Jul. 17, 2014

(65) Prior Publication Data

US 2015/0201455 A1 Jul. 16, 2015

Related U.S. Application Data

(60) Provisional application No. 61/927,000, filed on Jan. 14, 2014.

(51) Int. Cl.
*H04W 76/00* (2009.01)
*H04W 76/04* (2009.01)
(Continued)

(52) U.S. Cl.
CPC ......... *H04W 76/048* (2013.01); *H04L 1/004* (2013.01); *H04W 4/008* (2013.01);
(Continued)

(58) Field of Classification Search
CPC ................................ H04B 10/11; H04B 7/00
(Continued)

(56) References Cited

U.S. PATENT DOCUMENTS

| 2005/0107032 A1* | 5/2005 | Homma | H04W 8/005 455/3.06 |
| 2013/0029604 A1* | 1/2013 | Saito | H04W 76/028 455/41.2 |

(Continued)

FOREIGN PATENT DOCUMENTS

EP 2557890 A1 2/2013

OTHER PUBLICATIONS

Gomez C., et al., "Overview and Evaluation of Bluetooth Low Energy: An Emerging Low-Power Wireless Technology", Sensors, vol. 12, No. 12, Dec. 29, 2012 (Dec. 29, 2012), pp. 11734-11753, XP055191782, ISSN: 1424-8220, DOI: 10.3390/s120911734, p. 11737-p. 11738.

(Continued)

*Primary Examiner* — Wen Huang
(74) *Attorney, Agent, or Firm* — Muncy, Geissler, Olds & Lowe, P.C.

(57) ABSTRACT

A packet is received at a device, over a connection between the device and another device indicating suspending the connection. The device suspends the connection and stores a suspended connection attribute record having connection attributes for resuming the connection. The device receives an advertisement packet having a resume suspended connection request, and determines if the resume suspended connection request is a request to resume the connection associated with the suspended connection attribute record. If determining is affirmative, the device resumes the connection according to the stored connection attributes.

30 Claims, 4 Drawing Sheets

(51) Int. Cl.
*H04W 4/00* (2009.01)
*H04L 1/00* (2006.01)
H04W 76/02 (2009.01)
H04W 84/18 (2009.01)

(52) U.S. Cl.
CPC ........ *H04W 76/045* (2013.01); *H04W 76/028* (2013.01); *H04W 84/18* (2013.01)

(58) Field of Classification Search
USPC ...................................................... 455/41.2
See application file for complete search history.

(56) References Cited

U.S. PATENT DOCUMENTS

| 2013/0045684 | A1* | 2/2013 | Linde ................... H04W 80/02 455/41.2 |
| 2013/0067068 | A1 | 3/2013 | Hassan et al. |
| 2013/0182798 | A1 | 7/2013 | Lozano |
| 2014/0286644 | A1* | 9/2014 | Oshima .................. H04B 10/11 398/118 |
| 2015/0172901 | A1* | 6/2015 | Kasslin ................ H04W 4/008 370/328 |

OTHER PUBLICATIONS

International Search Report and Written Opinion—PCT/US2015/010600—ISA/EPO—Jun. 5, 2015.
Nordic Semiconductor, "Bluetooth low energy wireless technology backgrounder," Version 4: Updated Mar. 22, 2011, 8 pages.
Smith D., "iOS 7: What's New in Bluetooth LE?," Sep. 18, 2013, Retrieved from the Internet < URL: http://www.doubleencore.com/2013/09/whats-new-in-bluetooth-le-ios-7/ >, 5 pages.
Texas Instruments CC2540/41 Bluetooth® Low Energy Software Developer's Guide, V1.3.2., Texas Instruments, Document No. SWRU271F Version 1.3.1, 2013, 56 pages.
Bluetooth, "Specification of the Bluetooth System", vol. 6, Part B, Sections 2.3.1.2 and 2.3.3.1, Jun. 30, 2010, 14 Pages.

* cited by examiner

METHOD AND APPARATUS FOR BLUETOOTH LOW ENERGY SUSPEND AND RESUME

CROSS-REFERENCE TO RELATED APPLICATIONS

The present application for patent claims the benefit of U.S. Provisional Application No. 61/927,000 entitled "METHOD AND APPARATUS FOR BLUETOOTH LOW ENERGY SUSPEND AND RESUME," filed Jan. 14, 2014, assigned to the assignee hereof, and expressly incorporated herein by reference in its entirety.

FIELD OF DISCLOSURE

This disclosure relates generally to wireless multimedia systems and, more particularly, to low energy, short range wireless data communication.

BACKGROUND

Bluetooth (BT) is a short-range wireless communication protocol, for mobile phones, computers, digital cameras, wireless headsets, speakers, keyboards, mice or other input peripherals, and similar devices. BT supports a personal area network (PAN) between a master and a plurality slaves.

BT communication, though, can have a power consumption that in certain types of applications may require compromises in hardware or functionality, or may even render BT impractical. In part to address the power consumption issue, a variation, termed Bluetooth Low Energy or "BTLE" has been developed and adopted in various applications, particularly applications requiring infrequent event-driven transfer of small amounts of data. BILE effectively exploits the infrequent transfer by a corresponding low duty cycle operation, namely, switching at least one of the devices, e.g., a remote sensor, to a sleep mode from which the device(s) are awoken when there is new data to send. Example applications of BTLE include "coin cell" battery-operated sensors and actuators in various medical, industrial, consumer, and fitness applications (also known as "Smart" sensors or actuators), often connecting to devices such as BTLE enabled smart phones, tablets, and lap-tops (also known as "Smart Ready" device).

In an example BTLE operation, a BTLE enabled peripheral device, e.g., a remote sensor, is configured to be awoken by, for example, a timer or sensing event and, upon awakening, to switch to an advertising mode. In the advertising mode the BTLE enabled peripheral device can send a "here I am, with data" advertisement packet. Another device, for example, a BTLE-equipped smart phone, can be configured to periodically switch to an initiator mode and scan for the advertisement packet. When the BTLE-equipped smart phone, in its initiator mode, detects the advertisement packet, it responds with a BTLE protocol connection request packet. The BTLE protocol connection request packet can include attributes that define the BTLE connection. Example attributes can include a frequency hopping sequence, connection interval, and encryption data. Once a connection is established, the BTLE-equipped smart phone switches from the initiator mode to a master device mode, and the BTLE enabled peripheral device switches from its advertiser mode to a slave device mode.

However, in known conventional BTLE, when the transfer of the data associated with the wake-up event is complete, the connection can be terminated. As a result, the connection attributes, for example the frequency hopping sequence and encryption data, as well as application state are lost. Therefore, every time the connection is re-established, the connection and application state must be re-established. Re-establishing the connection and application state can consume power, bandwidth and time. Such consumption can pose problems because, for example, many BTLE enabled peripheral devices may have small battery capacity, or may be packaged or located such that frequent battery replacement is not practical.

SUMMARY

This Summary identifies some features and is not, and is not intended to be an exclusive or exhaustive treatment description of the disclosed subject matter. Additional features and further details are found in the detailed description and appended claims. Inclusion in the Summary is not reflective of importance. Additional aspects will become apparent to persons skilled in the art upon reading the following detailed description and viewing the drawings that form a part thereof.

In one example a method for wireless communicating is disclosed. The method can include receiving at receiving at a device, over a connection, a packet indicating suspending the connection, wherein the connection may be between the device and another device and, in response to the packet indicating suspending the connection, suspending the connection, and storing at the device a suspended connection attribute record. According to an aspect, the suspended connection attribute record is associated with the connection, and the suspended connection attribute record includes connection attributes for resuming the connection. The one example method further includes receiving at the device an advertisement packet having a resume suspended connection request, and determining whether the resume suspended connection request is a request to resume the connection associated with the suspended connection attribute record. The one example method may include, in response to an affirmative result of the determining, resuming the connection, wherein the resuming is based at least in part on at least one of the connection attributes that are in the suspended connection attribute record In one example, a Bluetooth Low Energy (BTLE) enabled device is disclosed. The BTLE enabled device may include a processing unit, a memory coupled to the processing unit, configured to store a BTLE suspended connection attribute table, and a BTLE stack coupled to the processing unit, having a BTLE host processor, and comprising a BTLE controller having a BTLE transceiver, and further comprising a BTLE host controller interface configured to interface the BTLE host processor and the BTLE controller. In the BTLE enabled device, in one example, memory is further configured to store computer-executable instructions, executable by the processing unit, the BTLE host processor, or both, that when executed by the processing unit, the BTLE host processor, or both, can cause the processing unit, the BTLE host processor or both to control receiving at the BTLE transceiver, over a BTLE connection between the BTLE enabled device and another device, a packet indicating suspending the BTLE connection and, in response to the receiving, to suspend the BTLE connection and store, in the BTLE suspended connection attribute table, a suspended connection attribute record, wherein the suspended connection attribute record includes connection attributes for resuming the BTLE connection. The memory can be further configured to store computer-executable instructions, executable by the processing unit, the BTLE host processor, or both, that when executed by the processing unit, the BTLE host processor, or both, can cause the processing unit, the BTLE host processor or both, to control receiving at the BTLE transceiver an advertisement packet having a resume suspended BTLE connection request, to determine whether the resume suspended BTLE connection request is a request to resume the BTLE connection associated with the suspended connection attribute record and, in response to an affirmative result of the determining, to resume the connection, wherein the resuming is based at least in part on at least one of the connection attributes that are in the suspended connection attribute record.

In one example, computer program product for storing computer executable instructions is disclosed. In one example, the instructions can include instructions that, when executed by a computer cause the computer to control receiving at a device, over a connection between the device and another device, a packet indicating suspending the connection and, in response, to control suspending the connection and to store in a memory at the device a suspended connection attribute record having connection attributes for resuming the connection, and to control receiving at the device an advertisement packet having a resume suspended connection request. In one example, the instructions can include instructions that, when executed by a computer cause the computer to determine if the resume suspended connection request is a request to resume the connection associated with the suspended connection attribute record, and in response to an affirmative result of the determining, to control resuming the connection, wherein the resuming is based at least in part on at least one of the connection attributes that are in the suspended connection attribute record.

In one example, an apparatus for wireless communicating is disclosed. In one example, the apparatus may include means for receiving, over a connection with another device, a packet indicating suspending the connection and, in response, suspending the connection, and storing a suspended connection attribute record having connection attributes for resuming the connection. In one example, the apparatus may further include means for receiving an advertisement packet having a resume suspended connection request, means for determining if the resume suspended connection request is a request to resume the connection associated with the suspended connection attribute record, means for resuming, in response to an affirmative result of the determining, the connection, wherein the resuming is based at least in part on at least one of the connection attributes that are in the suspended connection attribute record.

BRIEF DESCRIPTION OF THE DRAWINGS

The accompanying drawings are presented to aid in the description of aspects disclosed and are provided solely for illustration of the aspects and not any limitation thereof.

DETAILED DESCRIPTION

Aspects of the invention are disclosed in the following description and related drawings directed to specific aspects disclosed. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment or aspect described herein as "exemplary" is not necessarily to be construed as preferred or advantageous over other aspects. Likewise, the term "aspect disclosed" does not require that all aspects disclosed include the discussed feature, advantage or mode of operation. It will therefore be appreciated that the terminology used herein is for the purpose of describing particular aspects only and is not intended to be limiting of various aspects of the invention.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It will be understood that designation of elements as "first," "second," and so forth does not, unless explicitly stated or made clear from a particular context, limit the quantity or order (temporal or spatial) of those elements. For example, a reference to first and second elements does not mean that only two of the described elements may be employed, and does not mean that the first element must precede the second element in order of time, spatial position, or importance.

Except where stated otherwise, recitation of a "set of" elements means the set comprise one or more elements. In addition, unless stated otherwise phraseology of the form "at least one of X, Y, or Z" or "one or more of X, Y, or Y" or "at least one of the group consisting of X, Y, and Y," whether in the description or claims, are interchangeable and synonymous and mean "X or Y or Z, or X and Y, or X and Z, or X and Y and Z or any combination of these elements."

Figure 1:
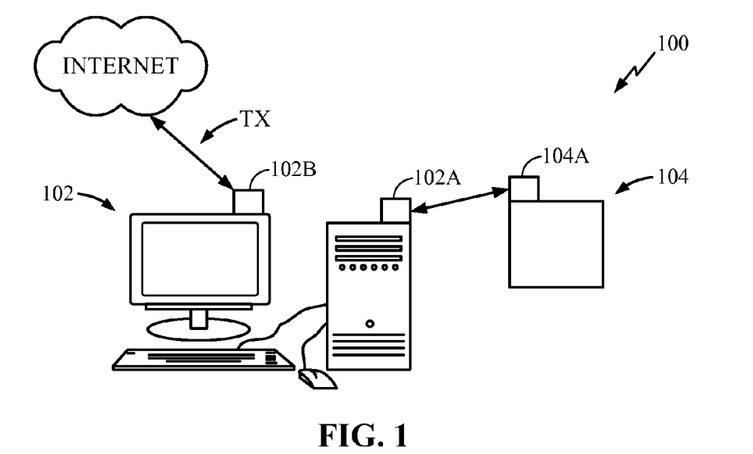
FIG. 1 shows one example system having Bluetooth LE (BTLE) connections between examples of BTLE enabled devices.

Referring to FIG. 1, one BTLE system 100 can include a BTLE enabled central device 102, for example, a desktop computer, a laptop computer, notebook computer, tablet computer, or other portable computing device, e.g., a cellular smart phone or any other programmable digital computing device. It will be understood that the BTLE enabled central device 102 can include processor and memory resources (not explicitly shown in FIG. 1) capable of supporting a BTLE host (not explicitly shown in FIG. 1). The BTLE enabled central device 102 can also include resources providing a BTLE controller (not explicitly shown in FIG. 1), a BTLE wireless transceiver, and a BTLE controller interface (not explicitly shown in FIG. 1). The BTLE enabled central device 102, in an aspect, can also include an Internet interface module 102B that interfaces, for example via a generic link LX, to the Internet. The generic link a LX can include, for example, a WiFi station or wireless router, and can connect to the Internet through, for example, an Internet Service Provider (ISP). The physical layer (not separately labeled) of the generic link LX can include, for example, DSL, satellite link, and/or optical fiber.

Referring still to FIG. 1, the BTLE system 100 can also include a BTLE enabled peripheral device 104, for example, without limitation, a heart monitor (not specifically shown in FIG. 1) or air quality sensor (not specifically shown in FIG. 1). The BTLE enabled peripheral device 104 may have BTLE functionality comparable to the BTLE functionality of the BTLE enabled central device 102, but may be limited to operating, with respect BTLE communications, in a slave mode.

Figure 2:
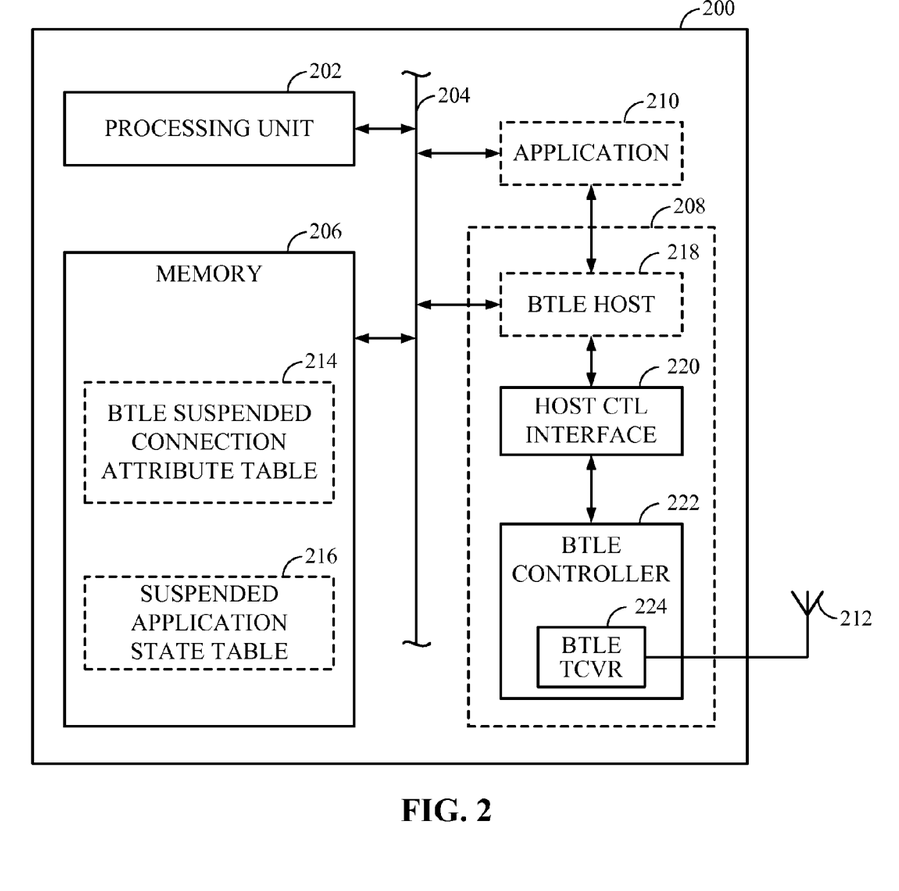
FIG. 2 shows a functional block schematic of one BTLE enabled device.

FIG. 2 shows a functional block schematic 200 of a BTLE enabled device that may implement, for example, the BTLE enabled central device 102. For brevity in the description that follows, the phrase "BTLE enabled device" 200 is introduced. The phrase "BTLE enabled device," as used herein, means "a BTLE-enabled device including capability and functionality that is either according to, or representable by, the functional block schematic 200." In an aspect, the FIG. 1 BTLE enabled peripheral device 104 may be implemented by a device according to the BTLE enabled device 200, or a reduced version of the BTLE enabled device 200, as described in greater detail later in this disclosure.

Referring to FIG. 2, the BTLE enabled device 200 can include a processing unit (CPU) 202 coupled by a bus 204 to a memory 206. In an aspect, the BTLE enabled device 200 can include a BTLE protocol stack 208 such as described in the Bluetooth Core Specification, Version 4.0 protocol specification. The BTLE protocol stack 208 may run under, for example, a higher-level application 210, hereinafter referred to as "application" 210. The BTLE protocol stack 208 can include a BTLE host 212, a BTLE host controller interface 214, and a BTLE controller 216. The BTLE controller 216 can include a BTLE transceiver 218 coupled to a BTLE antenna 220. The application 210, although shown as a single block within the BTLE enabled device 200, may be a distributed function, implemented by, for example, resources of the CPU 202 in combination with processor-executable instructions (not separately shown) stored in the memory 206. As illustrations, the application 210 may be a patient status monitoring application or an industrial process monitor. These are only examples, not intended as any limitation on the scope of any exemplary embodiment or any aspect thereof. In an aspect, the BTLE host 212 of the BTLE protocol stack 208 may be implemented, at least in part, by the CPU 202 in combination with processor-executable instructions (not separately shown) stored, for example, in the memory 206.

Referring to FIG. 2, in an aspect, the memory 206 can include, or support storage of a BTLE suspended connection attribute table 222. In a further aspect, the memory 206 can include or support storage of the suspended application state table 224. It will be understood that the term "table," as used herein, is only a label, and is not intended to define or limit structure, or arrangement of the BTLE suspended connection attribute table 222 or the suspended application state table 224. It will also be understood that the single block graphical representation of the memory 206 is not intended to limit or define the architecture or any structural feature of the memory 206. For example, the block shown as "memory" 206 can represent distributed memory resources, which may be within or integrated with other described functional blocks. As one illustrative example, a memory resource containing the BTLE suspended connection attribute table 222, or the suspended application state table 224, or both, may be within, or integrated with the BTLE controller 216. Such implementations may, in turn, provide and/or enable further features and/or benefits. For example, in an implementation where memory (not separately visible in FIG. 2) within or associated with the BTLE controller 216 stores the BTLE suspended connection attribute table 222 and the suspended application state table 224, the BTLE host 212 need not be aware that a connection is suspended and later resumed. For example, sufficient BTLE connection attribute information and application state information may be contained in the BTLE controller 216. Further, in such implementations, the information known to the BTLE host 212 that is particular to the invention may be, for example, information on whether or not the BTLE enabled device 200 supports the suspend and resume function. In one aspect, that information may be stored in the BTLE host 212. In another aspect, that information may reside in, or even solely in the BTLE controller 216.

In description herein of example conventional BTLE enabled devices and operations of such devices, the phrase "conventional BTLE enabled device(s)" without a reference number means, except where otherwise explicitly stated or made clear from the context to have a different meaning, one or more conventional BTLE enabled devices of which the BTLE enabled device 200 may be one example. In description herein of example conventional BTLE enabled central devices and operations of the same, the phrase "conventional enabled central device(s)" without a reference number means, except where other explicitly stated or made clear from the context to have a different meaning, one or more conventional BTLE enabled central devices of which the BTLE enabled central device 102 may be one example. Likewise, in description herein of example conventional BTLE enabled peripheral devices and operations of the same, the phrase "conventional enabled peripheral device(s)" without a reference number means, except where other explicitly stated or made clear from the context to have a different meaning, one or more conventional BTLE enabled peripheral devices of which the BTLE enabled central device 104.

Figure 3:
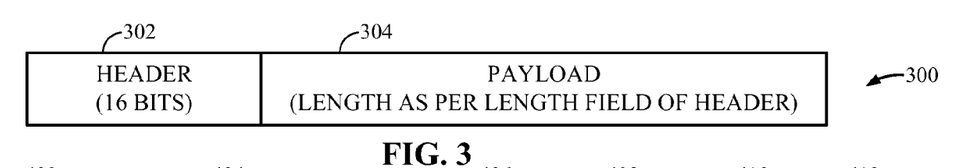
FIGS. 3 and 4 show, respectively, a conventional BTLE advertisement channel packet format, and a conventional header format of the conventional BTLE advertisement channel packet.

Conventional BTLE establishment of a conventional BTLE connection between, for example, a BTLE enabled peripheral device and a BTLE enabled central device, can include the BTLE enabled peripheral device waking up, for example, in response to a timer or external event. The BTLE enabled peripheral device can then switch to an advertising mode. In the advertising mode the BTLE enabled peripheral device can transmit, on one or more of the BTLE protocol's assigned 3 channels of its defined 40 channels, conventional BTLE advertisement packets. FIG. 3 shows a BTLE advertising packet format 300. The BTLE advertising packet format 300 may be in accordance with known, conventional BTLE advertising packet format. As known to persons of ordinary skill, the BTLE advertising packet format 300 may be carried as the protocol data unit (PDU) (not explicitly labeled on FIG. 3) within a conventional BTLE protocol packet (not fully visible in FIG. 3). Format and content specifications of the conventional BTLE protocol packet are known to persons of ordinary skill in the art and, therefore, further detailed description is omitted. Format and content specification of the conventional BTLE advertising packet are also known to such persons, but example features will be summarized here for convenience.

Referring to FIG. 3, the BTLE advertising packet format 300 may include a BTLE advertising packet header 302 and an advertising packet payload 304. The BTLE advertising packet header 302 may have a length of 2 octets (i.e., 16 bits), and is described in further detail in reference to FIG. 4. Referring to FIG. 3, the advertising packet payload 304 may have a length ranging from 6 octets up to a BTLE-specified maximum length. The length of the advertising packet payload 304 may be specified in a particular field of the advertising packet header, as will be described in further detail in reference for FIG. 4.

Figures 4, 5:
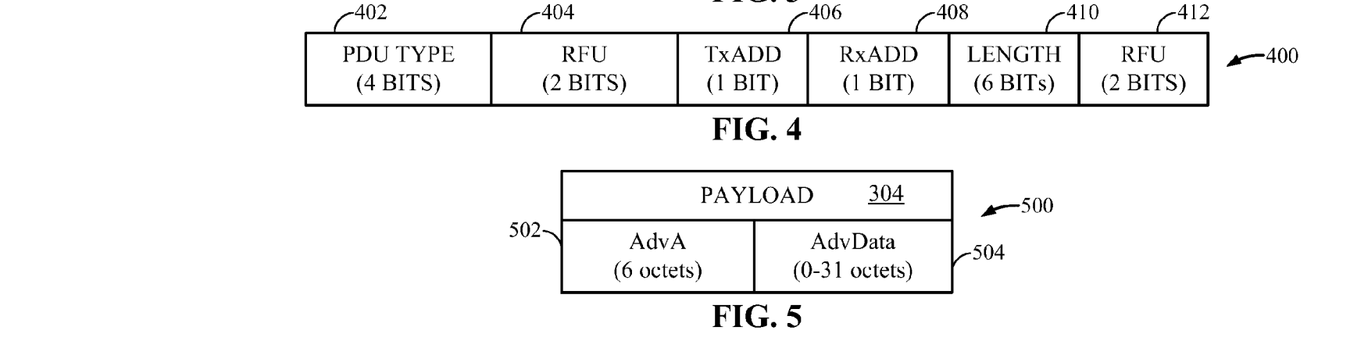
FIG. 5 shows a conventional BTLE advertisement packet payload format.

FIG. 4 shows a BTLE advertisement packet header format 400 which may be according to known, conventional BTLE advertising packet header format or protocol. Conventional BTLE advertising packet header protocol is known to persons of ordinary skill, but certain features will be summarized here for convenience. Referring to FIG. 4, the BTLE advertisement packet header format 400 may include a PDU type field 402, a reserved for future use (RFU) field 404, a TxADD field 406, an RxADD field 408, the above-described advertising payload length field 410, and another RFU field 412. As known to persons of ordinary skill, the function of the TxADD field 406 and of the RxADD field 408 may depend on the content of the PDU type field 402. The PDU type field 402 may have a length of 4 bits, the RFE 404 may have a length of 2 bits, and the TxADD field 406 and RxADD field 408 may each have 1 bit length. The advertising payload length field 410 may have a length of 4 bits and the RFU field 412 may have a 2 bit length. The PDU type field 402 may indicate an advertising type among a BTLE-specified set of advertising types. The BTLE-specified set of advertising types is known to persons of ordinary skill, and therefore detailed description is not necessary for such persons, having possession of the present disclosure, to practice according to the exemplary embodiments.

Figure 6:
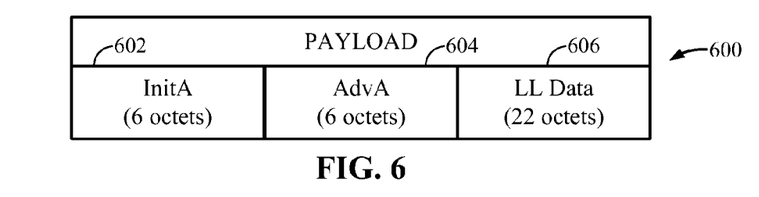
FIG. 6 shows a conventional BTLE connection request packet payload format.

FIG. 5 shows a BTLE advertisement packet payload format 500 which may be according to known, conventional BTLE advertising packet payload protocol. Conventional BTLE advertising packet payload protocol is known to persons of ordinary skill, but certain features will be summarized here for convenience. Referring to FIG. 5, the BTLE advertisement packet payload format 500 may include an advertiser address (AdvA) field and an advertisement data (AdvData) field 504. The AdvData field 504 may include information from the advertiser (e.g., the FIG. 2, BTLE enabled device 200) such as, for example, a device identifier (not specifically visible in FIG. 5), a transmit power (not specifically visible in FIG. 5) of the advertising device and/or remaining battery power (not specifically visible in FIG. 5) of the advertising device. o According to conventional BTLE techniques, the BTLE enabled central device can switch to an initiator mode and scan in the background for advertisements. When the BTLE enabled peripheral device has data to send, it sends advertisements of the same. Assuming the BTLE enabled central device switches to its initiator mode with an acceptable temporal alignment to the advertisement transmission of the BTLE enabled peripheral device, the BTLE enabled central device detects the advertisement packet. In response, BTLE enabled central device, acting in its initiator mode, sends the BTLE enabled peripheral device a connection request packet. FIG. 6 shows one payload 600 of one conventional BTLE connection request packet. Referring to FIG. 6, the payload 600 can include "InitA" field 602, which is the address (i.e., MAC address) of the BTLE enabled central device, "AdvA" field 604, which is the address (i.e., MAC address) of the BTLE enabled peripheral device, and "LL Data" field 606. The LL Data in the LL Data field 606 may be a set of BTLE connection attributes (not separately visible in FIG. 6) that defines the BTLE connection, and on which subsequent communication between the BTLE enabled peripheral device and the BTLE enabled central device depends.

Figure 7:
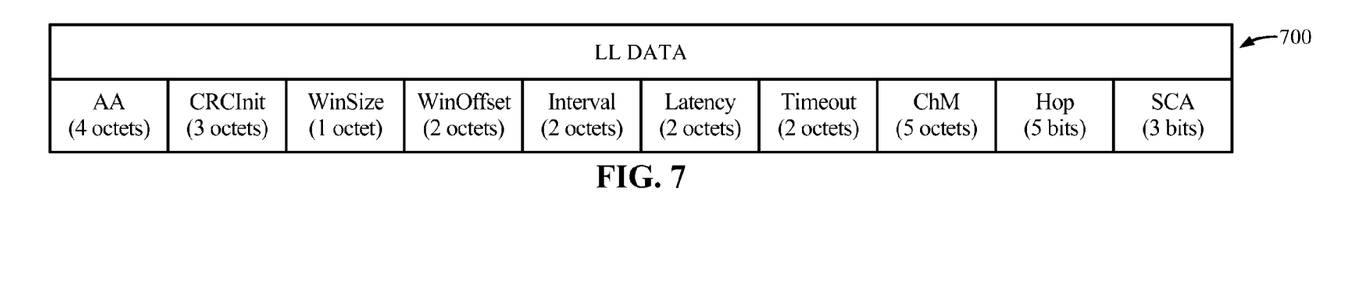
FIG. 7 shows a conventional format of the link level data field of the FIG. 5 conventional BTLE connection request packet payload format.

Referring to FIG. 7, fields of the conventional BTLE protocol LL Data (which is the FIG. 6 LL Data field 606) include "CRCInit," which is a value to initialize a cyclical redundant code (CRC) register (not shown in the figures) of the BTLE enabled peripheral device, and an interval parameter, termed "Interval," which defines a BTLE connection interval time. Continuing to refer to FIG. 7, fields of the conventional BTLE protocol LL Data can also include a hop parameter, termed "Hop," identifying a BTLE frequency hop sequence. Fields of the conventional BTLE protocol LL Data can also include "Latency," which is a number of communication intervals that the BTLE enabled peripheral device, as a slave in the subsequent BTLE protocol communications, may ignore without losing the BTLE connection. The conventional BTLE protocol LL Data can also include encryption parameters.

When the BTLE enabled peripheral device completes its sending of data (e.g., heart monitor data) over the BTLE connection established by the BTLE protocol messaging briefly summarized above, BTLE enabled peripheral device can terminate the BTLE connection and perform conventional BTLE operations for entering a standby state. However, when the BTLE enabled peripheral device, according to conventional BTLE techniques and operations, enters the standby state all (or at least a substantial number) of the BTLE connection attributes may be lost. Therefore, in a scenario such as a reporting by a BTLE heartbeat sensor to a BTLE enabled central device, each reporting can require, after awakening, performing another repeat of the above-described connection establishment messaging cycle. Each such repeat entails significant messaging, and a corresponding significant number of machine cycles, e.g., internal state recovery operations—both by the BTLE enabled central device and BTLE enabled peripheral device.

Such messaging and corresponding internal operations can consume power, which can be particularly undesired for the BTLE peripheral device. In addition, such messaging and corresponding internal operations can cause delays. Moreover, when the reporting is complete, then, according to conventional BTLE return to standby, the BTLE connection attributes (see, for example, the plurality of fields visible in FIG. 7) that power and time were expended to obtain are lost again.

Methods and systems according to various exemplary embodiments can provide, among other features and benefits, solutions to these and other shortcomings in known, conventional BTLE connection techniques. Various exemplary embodiments can provide, for example, among other features and benefits, a suspending of a BTLE protocol connection, and storage of the BTLE connection attributes of the suspended BTLE connection in table or other memory. The stored BTLE connection attributes can be referenced alternatively as the "suspended connection attribute record" or "suspended BTLE connection attribute record." Various exemplary embodiments can further include, in response to given events described later in further detail, retrieving the stored BTLE connection attributes and resuming the BTLE connection. As will be appreciated, the exemplary embodiments' retrieving and restoring can significantly reduce the BTLE connection messaging and significantly reduce correspond internal operations by the BTLE enabled peripheral device and the BTLE enabled central device.

Another shortcoming of conventional techniques for BTLE protocol sleep-awaken-reconnection is that, when the BTLE connection terminated, not only can all, or a substantial number of, the BTLE connection attributes be lost, but higher-level applications pertaining to data transferred by the BTLE communications, upon becoming aware of the termination, can lose application states. Therefore, when a BTLE connection is terminated, subsequent re-connection can also require another re-initialization of the application, which carries additional processing overhead.

Methods and systems according to various exemplary embodiments can provide, among other features and benefits, a storing, upon such termination of a BTLE protocol connection, of application state parameters and, in accordance with further described features, retrieving the stored application state parameters to process data received from the resumed connection, without, or with substantial reduction in processing overhead.

It will be appreciated that another of the various features of the exemplary embodiments is that applications under which the BTLE host runs, can be unaware of the BTLE connection being suspended. This, in turn, can prevent or significantly reduce application states being lost.

In an aspect, a BTLE host, supported by a BTLE enabled central device or by a BTLE enabled peripheral device, can be configured to assume that the other BTLE enabled device (i.e., the other of the BTLE enabled central device or BTLE enabled peripheral device) supports suspension and resumption of BTLE connection in accordance with one or more exemplary embodiments. In another aspect, the BTLE enabled peripheral device or BTLE enabled central device, or both, can be configured to determine, for example by a query message, at an initial or one-time connection, if the other device can support suspension and resumption of BTLE connection in accordance with one or more exemplary embodiments. The query message may be, for example, query of a particular aspect, such as whether the other device supports sending a packet indicating suspending the BTLE connection. For example, the BTLE enabled central device may be configured to send the BTLE enabled peripheral device a suspension capability query message, prior to receiving a packet indicating suspending the BTLE connection, to determine whether the BTLE enabled peripheral device supports sending a packet indicating suspension of BTLE connection in accordance with one or more exemplary embodiments.

In another aspect, the BTLE enabled peripheral device or the BTLE enabled central device, or both, can be configured to receive from the other, prior to either sending a packet indicating suspending the BTLE connection, a suspend-resume capability query message. The suspend-resume capability query message may be configured to determine whether the device receiving the suspend-resume capability query message supports suspend-resume according to the exemplary embodiments, e.g., supports receiving a packet indicating suspending the BTLE connection. As previously described, in an aspect, the information on whether the receiving device supports suspend-resume according to exemplary embodiments may be stored in its BTLE controller, e.g., in the FIG. 2 BTLE controller 216. In a related aspect, the BTLE enabled peripheral device or the BTLE enabled central device, or both, can be configured to respond to the suspend-resume capability query message by generating and sending a capability query response message. The capability query response message can indicate whether the device that received the suspend-resume capability query message supports receiving a packet indicating suspending the BTLE connection.

In an aspect, methods and systems according to various exemplary embodiments can provide a General Access Profile (GAP) service containing proprietary characteristics indicating the feature is supported, and this can be discovered during an initial BTLE connection. In a further aspect, the supported feature characteristic can be cached, for example in a memory of the BTLE enabled central device, and used by the BTLE enabled central device for subsequent BTLE connection to the same peripheral device. The caching of the supported feature characteristic may be, for example, in the BTLE host of the BTLE enabled central device.

According to various exemplary embodiments, the BTLE enabled peripheral device can be configured to initiate suspension of its BTLE connection with a BTLE enabled central device. For example, the BTLE enabled peripheral device can be configured to send, over the existing BTLE connection, an "LL_TERMINATE_IND, with an error code set to SUSPEND. The error code set to SUSPEND can be a supplement to the BTLE protocol in accordance with one or more exemplary embodiments. The BTLE enabled central device can be configured to detect the LL_TERMINATE_IND with an error code set to SUSPEND, and, in response, can save the BTLE connection attributes. The BTLE connection attributes may be saved as a suspended connection attribute record. In an aspect, the suspended connection attribute record can include an address of the other device, e.g., the address of the BTLE enabled peripheral device.

In an aspect, the BTLE enable peripheral device can be configured to initiate resumption of the suspended BTLE connection, for example, in response to a timer event or a sensor event, resume the BTLE connection. In a further aspect, the BTLE enabled peripheral device can begin by sending directed advertisements, generally in accordance with conventional BTLE directed advertisement protocol, but supplemented with a flag field or other extra field for carrying, for example, a "request-to-resume suspended connection" flag. The extra field can be, for example, a byte that may be concatenated onto the end of the directed advertising packet. The extra byte, or other extra field, can include a bit, or a plurality of bits representing the request-to-resume suspended connection flag, indicating that the BTLE enabled peripheral device wants to resume a previously suspended BTLE connection. In an aspect, the supplemented BTLE directed advertisement packet may include an address of the advertising device, e.g., the address of the BTLE enabled peripheral device.

In an aspect, the BTLE enabled central device can be configured to determine if a supplemented BTLE directed advertisement packet is a request to resume a previously suspended BTLE connection by inspecting the flag field, in combination with comparing the address of the advertising device to the address of the other device in the suspended connection attribute record. If the inspecting detects the request-to-resume suspended connection request flag in the flag field, in conjunction with the comparing matching the address of the advertising device to the address of the other device in the suspended connection attribute record, the determining is affirmative.

The BTLE enabled central device can be configured to respond to an affirmative determination of the supplemented BTLE directed advertisement packet being a request to resume a previously suspended BTLE connection, by sending a particularly configured connection request. The particularly configured connection request may, for example, generally conform to conventional BTLE protocol but, in an aspect, can have an acknowledgement flag indicating that the BTLE enabled central device will resume the previously suspended BTLE connection.

Further to this aspect, the BTLE enabled central device can be configured to detect an event of having lost, or having never stored, the attributes of the previous BTLE connection that the now advertising BTLE enabled peripheral device wishes to resume. The BTLE enabled central device can be configured to detect this event, for example, by detecting a request-to-resume suspended connection flag in conjunction with finding no match of the address of the advertiser with an address in the suspended connection attribute record. In a further aspect, BTLE enabled central device can be configured to respond by, for example, setting the field of the connection request that was previously described as carrying an acknowledgement flag to another value. The value can be any value the BTLE enabled peripheral device can be configured to recognize as indicating the BTLE enabled central device cannot resume the previously suspended BTLE connection. The BTLE enabled peripheral device can be configured to respond to receiving a connection request having that value by treating the connection request as a new connection request in accordance with conventional BTLE connection establishment. In a further aspect, the BTLE enabled peripheral device can be configured to respond to receiving the new connection request by flushing previous BTLE connection attributes from its memory. The flushing may be performed because the new BTLE connection, and its attributes, will be defined by the BTLE enabled central device.

One or more exemplary embodiments can include supplementing conventional BTLE packet structure by adding a "suspend connection" command field. The "suspend connection" command field may be added, for example, to the structure of BTLE packets used in normal BTLE communications from a BTLE enabled central device to a BTLE enabled peripheral device, and visa versa. In an aspect the suspend connection command field may be configured to carry, in the BTLE advertisement packet structure, the request-to-resume suspended connection flag that is described above. In a related aspect, the suspend connection command field may be configured to carry, when in the BTLE connection request packet structure, an acknowledgement, i.e., a "will resume suspended connection" flag.

Example operations according to exemplary embodiments are described above in terms of the BTLE enabled peripheral device initiating suspension of a BTLE connection with a BTLE enabled central device. It will be understood that exemplary embodiments are not limited to the BTLE enabled peripheral device initiating suspension of a BTLE connection with a BTLE enabled central device. On the contrary, exemplary embodiments contemplate the BTLE enabled peripheral device, or the BTLE enabled central device, or both, being configured to initiate suspension of a current BTLE connection with the other. For example, according to one or more exemplary embodiments, the BTLE host of the BTLE enabled central device can instruct its respective BTLE controller, for example, through its respective BTLE host controller interface, to send, over the BTLE connection to be suspended, information such as the "LL_TERMINATE_IND, with an error code set to SUSPEND.

It will be understood that labels and names such as, but not limited to "LL_TERMINATE_IND" are arbitrary, and are not intended to limit the scope of any exemplary embodiments.

In an alternative aspect, the particular supplementing of the BTLE protocol for the BTLE enabled peripheral device to communicate suspension of BTLE connection to the BTLE enabled central device, or vice versa, can include an extended error code. In an aspect, the extended error code can be compliant with the Bluetooth specification.

In an aspect, the BTLE enabled central device can be configured to inspect the suspend connection field of the extended error code field of the supplemented BTLE protocol packets it receives. The inspection can detect the presence and absence of an indication, in the suspend connection field, to suspend BTLE connection with the BTLE enabled peripheral device. In a further aspect, the BTLE enabled central device can be configured to respond to detection of the indication to suspend BTLE connection by storing, for example, in a connection attribute storage table or equivalent, attributes of the BTLE connection, and suspending the BTLE connection.

It will be understood that one or more exemplary embodiments can further include known, conventional means (not separately shown in the figures) for terminating a BTLE connection between a BTLE enabled peripheral device and a BTLE enabled central device. As known to persons of ordinary skill in the art, such conventional BTLE connection termination techniques can omit saving substantive connection attribute information or, if any connection attribute information is saved, it may be insufficient to re-establish the BTLE connection without conventional BTLE connection establishment messaging. Since such conventional BTLE connection termination techniques are known to persons of ordinary skill, further detailed description is omitted.

It will also be understood that one or more exemplary embodiments can further include known, conventional means (not separately shown in the figures) for pairing and bonding a BTLE enabled central device with one or more BTLE enabled peripheral devices. Since conventional BTLE device pairing and bonding techniques are known to persons of ordinary skill, further detailed description is omitted.

Referring to FIG. 2, in accordance with an aspect, one example BTLE enabled central device 200 in accordance with various exemplary embodiments can include the BTLE suspended connection attribute table 222. In a related aspect, the CPU 202 can be configured, for example, by executing particular computer-readable instructions in the memory 206 in response to detecting the indication of suspending connection received from the BTLE enabled peripheral device, to store the example FIG. 7 LL Data connection attributes, or other suspended connection attributes, in the FIG. 2 BTLE suspended connection attribute table 222.

In an aspect, the CPU 202 and the BTLE suspended connection attribute table 222 can be configured, for example, by configuring the computer-executable instructions in the memory 206, to store the suspended connection attributes in the BTLE suspended connection attribute table 222, as a suspended connection attribute record. The configuration may include, for example, the suspended connection attribute record being stored to be retrievable based on the address of the BTLE enabled peripheral device to which the suspended connected was established.

Referring to FIG. 2, as described previously in this disclosure, it will be understood that the memory 206 can be a distributed resource, and may include various memory resources within, or integrated with other described functional blocks. In addition, portions (not separately labeled) of the memory 206 may store certain instructions (not separately shown) for the CPU 202, and portions of the memory 206 (not separately shown) may store the BTLE suspended connection attribute table 222, and these respective portions are not necessarily within the same hardware device (not separately shown).

The above-described example storing of the suspended connection attribute record in the BTLE suspended connection attribute table 222 was in response to the BTLE enabled central device detecting, in the supplemented BTLE protocol packet received from the BTLE enabled peripheral device, an indication of suspension of the BTLE connection. In one alternative embodiment, the BTLE suspended connection attribute table 222 can be configured as a "suspended BTLE connection attribute table" 222 that stores a "suspended" BTLE connection attribute record for every BTLE connection currently established by the BTLE enabled central device 200, where "currently established" means the BTLE connection is active or currently suspended. In an aspect according to this alternative embodiment, the BTLE enabled central device 200 can be configured to erase the suspended BTLE connection attribute record, i.e., the BTLE connection attributes, of a BTLE connection terminated by means other than receiving a suspend connection indication from the BTLE enabled peripheral device. In a related aspect, the BTLE enabled central device 200 can be configured to maintain and, for example, flag as "suspended" the stored connection attributes of a BTLE connection suspended in response to receiving a suspend connection indication from the BTLE enabled peripheral device.

Figure 8:
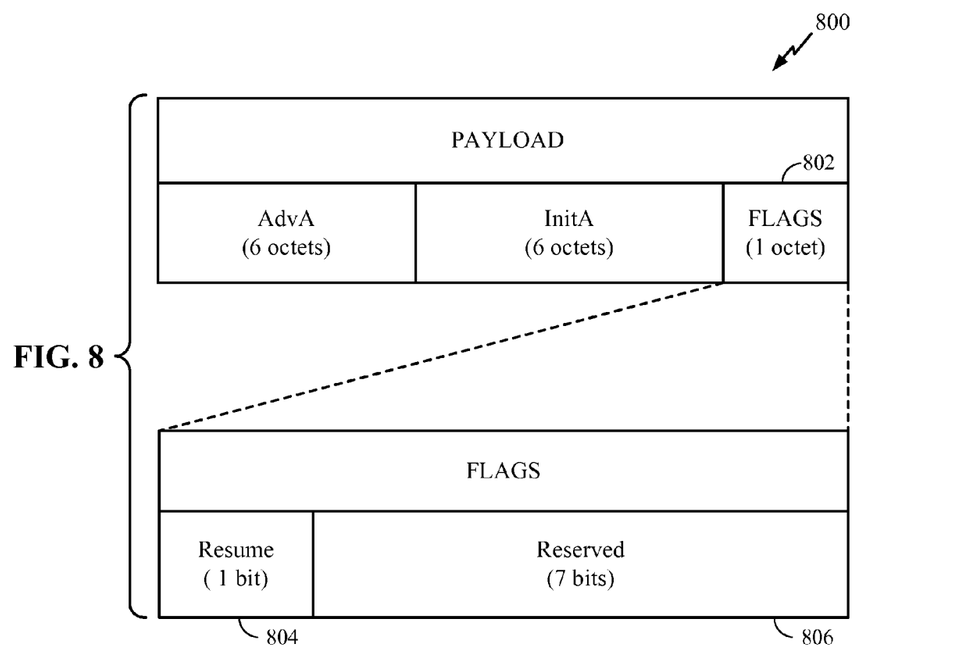
FIG. 8 shows one example format of a supplemented BTLE protocol directed BTLE advertisement packet, having a request-to-resume connection flag field in accordance with one or more exemplary embodiments.

In accordance with one or more exemplary embodiments, the BTLE enabled central device 200 can be configured to receive particular supplemented BTLE advertisement packets having, in addition to conventional BTLE advertisement packet fields, a resume suspended connection flag field. The resume suspended connection flag field can be configured to carry a flag or other indicator switchable to a value indicating an active request to resume a previously suspended BTLE connection. The flag or other indicator can be, for example, the "request-to-resume suspended connection flag" described earlier in this disclosure. FIG. 8 shows example format 800 of a supplemented BTLE protocol directed BTLE advertisement packet, having a resume suspended connection flag field 802. Referring to FIG. 8, in an example, the resume suspended connection flag field 802 can have a partitioning, such as the "Resume" flag field 804 having, for example, 1 bit and, optionally, a "Reserved" field 806 having, for example, 7 bits. The value in the "Resume" flag field 804 can be, for example, the request-to-resume suspended connection flag.

In an aspect, the BTLE enabled central device 200 in accordance with one or more exemplary embodiments can be configured to determine if an advertisement packet having a request-to-resume suspended connection flag in its "Resume" flag field 804 is a request to resume a BTLE connection that it suspended in response to the above-described packet indicating suspension of connection. For example In a further aspect, the determination can provide a BTLE enabled central device 200, in accordance with one or more exemplary embodiments, with features including individually suspending and individually resuming, each of a plurality of different BTLE connections with a corresponding plurality of BTLE enabled peripheral devices. It will be understood, in this context, that "BTLE enabled peripheral device" can include a thread or application. Further to this aspect, the BTLE suspended connection attribute table 222 can be configured to include, in each suspended connection attribute record, an address (or other unique identifier) of the BTLE enabled peripheral device associated with the suspended BTLE connection. In an aspect, the BTLE enabled central device 200 can be configured to respond to detecting a request-to-resume connection flag in a supplemented BTLE protocol BTLE resume advertisement packet by checking the BTLE suspended connection attribute table 222 for a matching address. In an example, in response to an affirmative result of the determining, the BTLE enabled central device can retrieving the connection attribute parameters and resume the BTLE connection.

Figure 9:
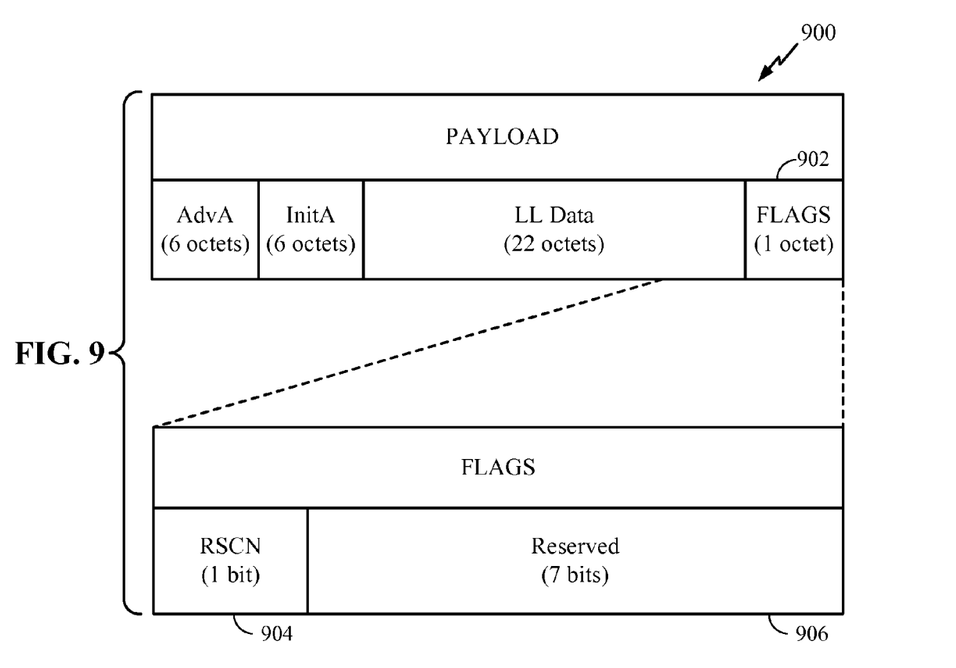
FIG. 9 shows one example format of a supplemented BTLE protocol connection request packet, having a resume connection acknowledgment field in accordance with one or more exemplary embodiments.

FIG. 9 shows one example format 900 of a supplemented BTLE protocol request connection packet having a resume connection acknowledgement flag field 902 in accordance with one or more exemplary embodiments. Referring to FIG. 9, in an example, the resume connection acknowledgement flag field 902 can include a "Resume Acknowledge" or "RSCN" flag field 904 having, for example, 1 bit and, optionally, a "Reserved" field 906 having, for example, 7 bits.

Figure 10:
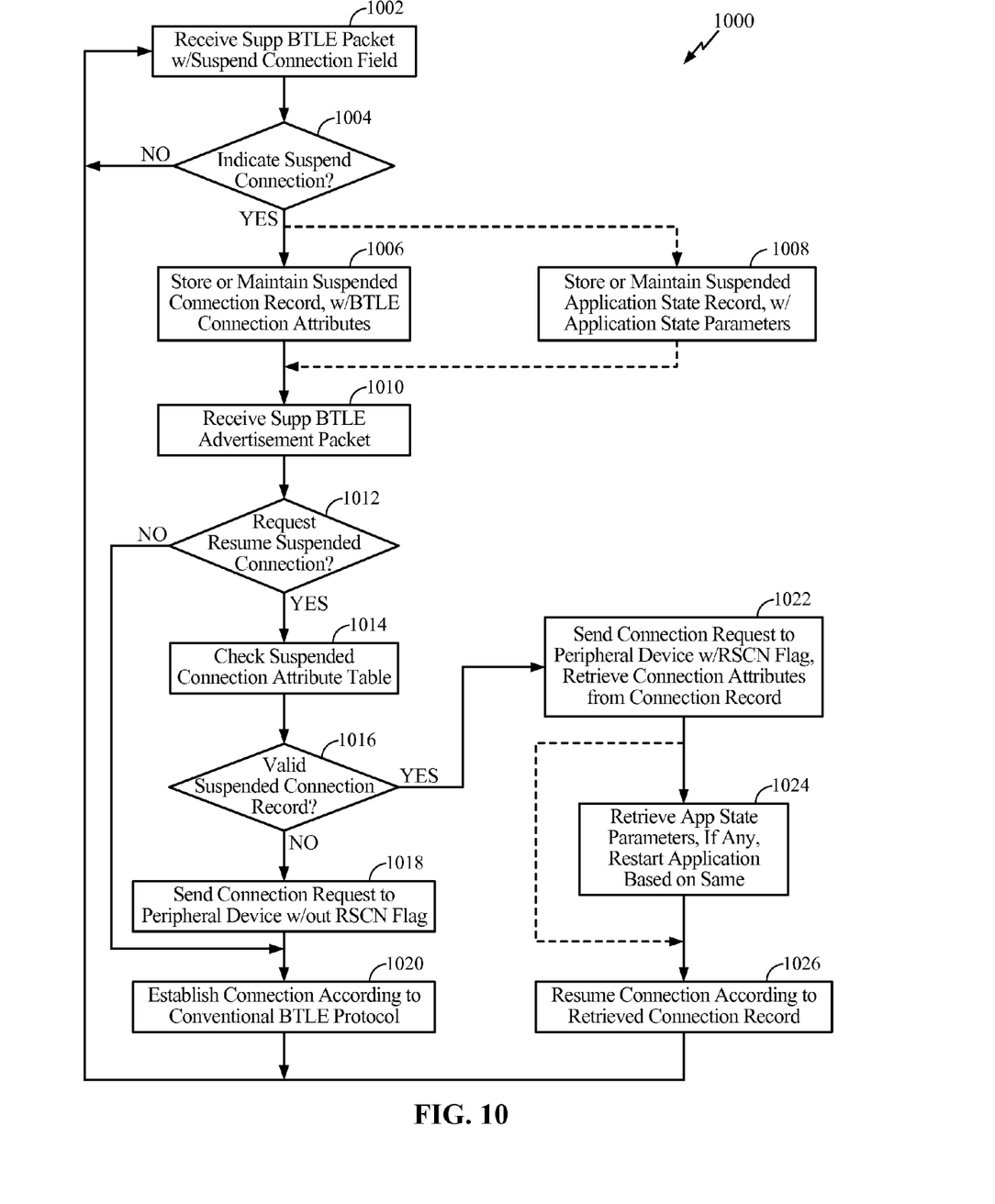
FIG. 10 shows one signaling flow diagram representing example operations in one suspend and resume process at a central device in accordance with one or more exemplary embodiments.

FIG. 10 shows one signaling flow diagram 1000 representing example operations in one suspend and resume process at a BTLE enabled central device in accordance with one or more exemplary embodiments. Example operations will be described in reference to the FIG. 2 example BTLE enabled central device 200, but it will be understood that this is not intended to limit the scope of any embodiment or aspect therefore.

Referring to FIG. 10, example operations in one suspend and resume process can assume an ongoing BTLE connection between the FIG. 2 BTLE enabled central device 200 and an example BTLE enabled peripheral device such as the FIG. 1 BTLE enabled peripheral device 104. It will be assumed that the FIG. 2 BTLE enabled central device 200 can include a BTLE protocol stack 208 configured, for example, to receive supplemented BTLE protocol packets having either a suspend connection field or an extended error code capable of representing a suspend connection indication in accordance with one or more exemplary embodiments.

Continuing to refer to FIG. 10, example operations in one suspend and resume process can include the FIG. 2 BTLE enabled central device 200 receiving, at 1002, over a BTLE connection in accordance with conventional BTLE protocol (except for the supplemented BTLE protocol packets) packets from the FIG. 1 BTLE enabled peripheral device 104. The receiving at 1002 may include, in accordance with conventional BTLE protocol connection events, the BTLE enabled central device 200 operating as the BTLE master device and the FIG. 1 BTLE enabled peripheral device 104 operating as a BTLE slave device. Such operation may include the BTLE enabled central device 200 sending packets over the BTLE connection to the FIG. 1 BTLE enabled peripheral device 104, and the FIG. 1 BTLE enabled peripheral device 104 responding, for example, with packets of sensor data. At 1004, the BTLE enabled central device 200 can check the received packet for indication that the BTLE enabled peripheral device 104 wishes to suspend the BTLE connection. For example, at 1004 the BTLE enabled central device may check a supplemented suspend connection field, or an extended error code of the supplemented BTLE packet received at 1002 If the answer at 1004 is "NO," the operations can include returning to 1002. If the answer at 1004 is "YES" operations at the BTLE enabled central device 200 can proceed to 1006 to store or maintain in the BTLE suspended connection attribute table 222 a suspended connection attribute record having the BTLE attributes that define the BTLE connection over which the example supplemented BTLE protocol packets were received at 1002.

Referring to FIG. 10, in an aspect, operations at the BTLE enabled central device 200 in response to the detecting at 1004 can also include, at 1008, storing at least one application state parameters defining the state of the application running at the BTLE enabled central device 200 that corresponds to receiving the example supplemented BTLE protocol packets at 1002. The parameters may be stored or, for example, in the suspended application state table 224. The parameters stored or maintained at 1008 can be referred to as "suspended application state parameters."

As to which particular parameters a given application can be the "suspended application state parameters," persons of ordinary skill in the general communication arts that employ BTLE communication can appreciate that selecting the suspended application state parameters can be application specific. Such persons can appreciate, though, that determination of the suspended application state parameters can use the following general guideline: the suspended application state parameters, when retrieved, can provide restart or continuation of the application with significant reduction of overhead clock cycles. The phrase "overhead clock cycles," in this context, can mean the number of clock cycles, after initiation of a resume process, to arrive at a state in the application that advances, clock-by-clock, in step with the application as it would have advanced in the absence of the suspension. Accordingly, further detailed description of the selection of suspended application state parameters that can be stored at 1008 is omitted.

Continuing to refer to FIG. 10, example operations in one suspend and resume process can include, at some future time after the above described storing of a suspended connection attribute record at 1006 and, optionally, a storing of a suspended application state record at 1008, receiving, at 1010 a supplemented BTLE protocol advertisement packet. In an aspect, the supplemented BTLE protocol advertisement packet may have a field for indicating that the sender wishes to resume a previously suspended BTLE connection. The supplemented BTLE protocol advertisement packet received at 1010 can be, in one example, according to the FIG. 8 example format 800. In an aspect, the supplemented BTLE protocol advertisement packet received at 1010 can be a directed advertisement having the address of the BTLE enabled central device 200. Referring to FIG. 8, the supplemented BTLE protocol advertisement packet received at 1010 can have, for example in the "InitA" field, the address of the BTLE enabled central device 200. The receiving at 1010 can include the BTLE enabled central device 200 qualifying the received advertisement packet as being a directed advertisement addressed to that BTLE enabled central device 200. In an aspect, the receiving at 1010 can also include the BTLE enabled central device 200 qualifying the received advertisement packet as having a sender address, i.e., the "AdvA" address, matching a list of authorized peripheral devices.

Referring to FIG. 10, example operations in one suspend and resume process according to the flow 1000 can include, after the receiving at 1010, the BTLE enabled central device 200 checking, at 1012, a field, for example, the "Resume" flag field 804 of the FIG. 8 resume suspended connection flag field 802. The "Resume" flag field 804 can hold a flag or other value indicating that the sender (i.e., the BTLE enabled peripheral device 1004) wishes to resume a previously suspended BTLE connection. If the answer at 1012 is NO, operations further to one example suspend and resume process according to the flow 1000 can go to 1020, and establish a BTLE connection with the advertiser in accordance with conventional BTLE connection establishment messaging. If the answer at 1012 is YES, operations further to one example suspend and resume process according to the flow 1000 can go to 1014 and check the suspended connection attribute table, for example the suspended connection attribute table 222. As previously described in reference to FIG. 2, in an aspect, the suspended connection attribute records can be stored in the suspended connection attribute table 222 to be retrievable based on the address of the advertiser.

With continuing reference to FIG. 10, example operations in one suspend and resume process according to the flow 1000 can include, after checking the suspended connection attribute table at 1014, a decision block at 1016 that routs subsequent operations based on whether a valid suspended connection attribute record was found at 1014. In an aspect, if the answer at 1016 is NO, operations can proceed to 1018, where the BTLE enabled central device 200 sends a connection request to the sending BTLE enabled peripheral device that wanted to resume a suspended BTLE connection, but with its resume connection acknowledgment flag set to a value indicating that the BTLE connection cannot be resumed. In a related aspect, operations may then proceed to 1020, where (assuming the BTLE enabled peripheral device 104 is capable of conventional BTLE connection establishment), the BTLE enabled central device 200 can perform messaging and other operations in accordance with conventional BTLE establishment of a BTLE connection.

Referring to FIG. 10, if the answer at 1016 is YES, example operations in one suspend and resume process according to the flow 1000 can proceed to 1022 and send a connection request to the BTLE enabled peripheral device 104. The connection request sent at 1022 can have its resume connection acknowledgement flag, e.g., the FIG. 9 "RSCN" flag set to a value indicating that the suspended BTLE connection can be resumed. Concurrently or otherwise associated with sending the connection request to the BTLE enabled peripheral device 104 that indicates the suspended BTLE connection can be resumed, the BTLE enabled central device can also retrieve the connection attributes of the suspended BTLE connection, for example, from the BTLE suspended connection attribute table 222. As previously described, the attributes can include, referring also to FIG. 7, "CRCInit," "Interval," "Hop" and "Latency." In an aspect, associated with determining at 1016 that the suspended BTLE connection can be resumed, operations in one suspend and resume process in accordance with various exemplary embodiments can include, at 1024, retrieving application state parameters, if any, from the suspended application state table 224. Next, whether directly from 1022 or after 1022 and 1024, example operations in one suspend and resume process according to the flow 1000 can proceed to 1026 and resume the previously suspended BTLE connection according to the retrieved suspended connection attributes and, optionally, resume the application according to the retrieved application state parameters, if any.

Referring to FIG. 10, in an aspect, after establishing the BTLE connection at 1020, or resuming the previously suspended BTLE connection at 1026, operations further to one or more exemplary embodiments can return to 1002.

The functionality of the FIG. 2 blocks may be implemented as one or more electrical components. In an aspect, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, or as different subsets of a set of software modules, or a combination thereof. Also, it should be appreciated that a given subset (e.g., of an integrated circuit and/or of a set of software modules) may provide at least a portion of the functionality for more than one module.

In an aspect, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect disclosed can include a computer readable media embodying a method for interference management by a Wi-Fi device. Accordingly, the invention is not limited to illustrated examples and any means for performing the functionality described herein are included in aspects disclosed.

While the foregoing disclosure shows illustrative aspects disclosed, it should be noted that various changes and modifications could be made herein without departing from the scope of the invention as defined by the appended claims. The functions, steps and/or actions of the method claims in accordance with the aspects described herein need not be performed in any particular order. Furthermore, although elements disclosed may be described or claimed in the singular, the plural is contemplated unless limitation to the singular is explicitly stated.

What is claimed is:

1. A method for wireless communicating, comprising:
    receiving, at a first device, application data from a second device;
    processing, by an application, the application data;
    receiving at the first device, over a connection, a packet indicating suspending the connection, wherein the connection is between the first device and the second device;
    in response to the packet indicating suspending the connection,
    suspending the connection, and
    storing at the first device a suspended connection attribute record and a suspended application state parameter, wherein the suspended connection attribute record is associated with the connection and includes connection attributes for resuming the connection, and wherein the suspended application state parameter characterizes a state of the application after processing the application data;
    receiving at the first device an advertisement packet having a resume suspended connection request;
    determining whether the resume suspended connection request is a request to resume the connection associated with the suspended connection attribute record; and
    in response to an affirmative result of the determining, resuming the connection, wherein the resuming is based at least in part on at least one of the connection attributes that are in the suspended connection attribute record.

2. The method of claim 1, wherein the connection attributes include an initial value for a cyclical redundant code (CRC) register, an interval parameter defining a connection interval time, and a hop parameter defining a frequency hop sequence.

3. The method of claim 1, wherein the connection attributes include at least one of an initial value for a cyclical redundant code (CRC) register, an interval parameter and a hop parameter, or any combination of the initial value for a CRC register, the interval parameter and the hop parameter, wherein the interval parameter defines a connection interval time, and the hop parameter defines a frequency hop sequence.

4. The method of claim 1, wherein the connection is a Bluetooth Low Energy (BTLE) protocol connection.

5. The method of claim 4, wherein the connection attributes in the suspended connection attribute record include BTLE connection attributes.

6. The method of claim 4, wherein the connection attributes in the suspended connection attribute record include BTLE connection attributes, and wherein the BTLE connection attributes include an initial value for a cyclical redundant code (CRC) register, an interval parameter and a hop parameter, wherein the interval parameter defines a BTLE connection interval time, and the hop parameter defines a BTLE frequency hop sequence.

7. The method of claim 4, wherein the connection attributes in the suspended connection attribute record include BTLE connection attributes, and wherein the BTLE connection attributes include at least one of an initial value for a cyclical redundant code (CRC) register, an interval parameter and a hop parameter, or any combination of the initial value for a CRC register, the interval parameter or the hop parameter, wherein the interval parameter defines a connection interval time, and the hop parameter defines a frequency hop sequence.

8. The method of claim 1, further comprising sending from the first device to the second device, prior to receiving the packet indicating suspending the connection, a suspension capability query message, wherein the suspension capability query message is to determine whether the second device supports sending of packets indicating suspending the connection.

9. The method of claim 1, further comprising:
receiving from the second device, prior to receiving the packet indicating suspending the connection, a suspend-resume capability query message; and
generating and sending to the second device a capability query response message, wherein the capability query response message indicates whether the first device supports receiving packets indicating suspending the connection.

10. The method of claim 1, wherein the connection is a Bluetooth Low Energy (BTLE) connection, wherein the first device is a BTLE enabled device, wherein the packet indicating suspending the connection includes an error field having an error code that indicates suspending the BTLE connection.

11. The method of claim 10, wherein the suspended connection attribute record includes an address of the second device.

12. The method of claim 11, wherein the advertisement packet is from the second device as an advertising device, wherein the advertisement packet includes a BTLE directed advertisement having an address of the BTLE enabled device, an address of the advertising device, and a flag field, wherein the flag field has a resume suspended connection request flag, wherein the resume suspended connection request flag indicates that the advertising device wants to resume a previously suspended BTLE connection, and
wherein the determining is based at least in part on a combination of inspecting the flag field and comparing the address of the advertising device to the address of the second device in the suspended connection attribute record.

13. The method of claim 12, wherein the affirmative result of the determining is based at least on part on the detecting the resume suspended connection request flag in the flag field in conjunction with the address of the advertising device matching the address of the second device in the suspended connection attribute record.

14. The method of claim 13, wherein resuming the connection includes the BTLE enabled device sending, to the second device, a connection request, wherein the connection request includes an acknowledgement flag, and wherein the acknowledgement flag is set at a value indicating that the BTLE enabled device will resume the previously suspended BTLE connection.

15. The method of claim 14, further comprising:
in response to the affirmative result of the determining, retrieving the at least one application state parameter and performing the application in association with resuming the BTLE connection, wherein the performing is based, at least in part, on the retrieved at least one application state parameter.

16. The method of claim 12, further comprising: in response to detecting the resume suspended connection request flag in the flag field in conjunction with the comparing not indicating a match of the address of the advertising device to the address of the second device in the suspended connection attribute record,
sending, to the advertising device, a connection request having an indication that the BTLE enabled device is unable to resume the previously suspended BTLE connection.

17. The method of claim 16, further comprising:
receiving at the advertising device the connection request having the indication that the BTLE enabled device is unable to resume the previously suspended BTLE connection; and
in response to the receiving, flushing previous BTLE connection attributes from a memory of the advertising device.

18. The method of claim 1, wherein resuming the connection includes sending, from the first device to the second device, a packet having an acknowledgement flag set at a value indicating the resuming of the connection.

19. The method of claim 18, wherein the connection is a Bluetooth Low Energy (BTLE) connection, wherein the first device is a BTLE enabled device, wherein the packet indicating suspending the connection includes an error field having an error code that indicates suspending the BTLE connection.

20. The method of claim 1, further comprising:
in response to the affirmative result of the determining, retrieving the at least one application state parameter, and performing the application in association with resuming the connection based, at least in part, on the retrieved at least one application state parameter.

21. The method of claim 1, wherein the connection is a Bluetooth Low Energy (BTLE) connection, the suspended connection is a suspended BTLE connection, wherein the resume suspended connection request is a resume suspended BTLE connection request, wherein the method further comprises:
sending from the second device, over the BTLE connection, to the first device, the packet having an indication of suspending the BTLE connection;
suspending the BTLE connection at the second device;
associated with suspending the BTLE connection, storing connection attributes, at a memory of the second device, as stored connection attributes for resuming the BTLE connection;
transmitting, from the second device, the advertisement packet, wherein the advertisement packet has the resume suspended BTLE connection request and has an address of the second device;

receiving, at the second device, a connection request, wherein the connection request has a field carrying an acknowledgement flag; and in response to detecting the acknowledgement flag, retrieving, from the memory of the second device, the stored connection attributes for resuming the BTLE connection, and configuring the second device to resume the suspended BTLE connection, with the first device, in accordance with the stored connection attributes for resuming the BTLE connection.

22. The method of claim 21 further comprising, in response to the acknowledgement flag indicating that the BTLE connection cannot be resumed, clearing the memory of the second device of the stored connection attributes for resuming the suspended BTLE connection;

receiving, at the second device, new BTLE connection attributes; and configuring the second device to establish a new BTLE connection in accordance with the new BTLE connection attributes.

23. A Bluetooth Low Energy (BTLE) enabled device comprising: a processing unit;

a memory coupled to the processing unit, configured to store a BTLE suspended connection attribute table and a suspended application state table;

a BTLE stack coupled to the processing unit, having a BTLE host processor, and comprising a BTLE controller having a BTLE transceiver, and further comprising a BTLE host controller interface configured to interface the BTLE host processor and the BTLE controller, wherein the memory is further configured to store computer-executable instructions, executable by the processing unit, the BTLE host processor, or both, that when executed by the processing unit, the BTLE host processor, or both, cause the processing unit, the BTLE host processor or both to control receiving at the BTLE transceiver, over a BTLE connection between the BTLE enabled device and another device, a packet indicating suspending the BTLE connection and, in response to the receiving, to suspend the BTLE connection and store, in the BTLE suspended connection attribute table, a suspended connection attribute record, wherein the suspended connection attribute record includes connection attributes for resuming the BTLE connection, and store, in the suspended application state table, a suspended application state parameter that characterizes a state of an application after application data received from the other device is processed by the application;

to control receiving at the BTLE transceiver an advertisement packet having a resume suspended BTLE connection request;

to determine whether the resume suspended BTLE connection request is a request to resume the BTLE connection associated with the suspended connection attribute record; and in response to an affirmative result of the determining, to resume the connection, wherein the resuming is based at least in part on at least one of the connection attributes that are in the suspended connection attribute record.

24. The BTLE enabled device of claim 23, wherein resuming the connection includes sending, from the BTLE enabled device to the other device, a packet having an acknowledgement flag set at a value indicating the resuming of the connection.

25. The BTLE enabled device of claim 23, wherein the packet indicating suspending the connection includes an error field having an error code that indicates suspending the BTLE connection.

26. A non-transitory computer program product for storing computer executable instructions, including instructions that, when executed by a computer cause the computer:

to control receiving at a first device, over a connection between the first device and a second device, a packet indicating suspending the connection and, in response, to control suspending the connection and to store in a memory at the first device a suspended connection attribute record having connection attributes for resuming the connection a suspended application state parameter that characterizes a state of an application after processing application data received from the second device;

to control receiving at the device an advertisement packet having a resume suspended connection request;

to determine if the resume suspended connection request is a request to resume the connection associated with the suspended connection attribute record; and in response to an affirmative result of the determining, to control resuming the connection, wherein the resuming is based at least in part on at least one of the connection attributes that are in the suspended connection attribute record.

27. The non-transitory computer program product of claim 26, wherein resuming the connection includes sending, from the first device to the second device, a packet having an acknowledgement flag set at a value indicating the resuming of the connection.

28. The non-transitory computer program product of claim 26, wherein the packet indicating suspending the connection includes an error field having an error code that indicates suspending a Bluetooth Low Energy (BTLE) connection.

29. An apparatus for wireless communicating, comprising:

means for receiving application data from a second device;

processing, by an application, the application data;

means for receiving, over a connection with the second device, a packet indicating suspending the connection and, in response, suspending terminating the connection, and storing a suspended connection attribute record having connection attributes for resuming the connection and a suspended application state parameter that characterizes a state of the application after processing the application data;

means for receiving an advertisement packet having a resume suspended connection request;

means for determining if the resume suspended connection request is a request to resume the connection associated with the suspended connection attribute record; and means for resuming, in response to an affirmative result of the determining, the connection, wherein the resuming is based at least in part on at least one of the connection attributes that are in the suspended connection attribute record.

30. The apparatus of claim 29, wherein the packet indicating suspending the connection includes an error field having an error code that indicates suspending a Bluetooth Low Energy (BTLE) connection.

\* \* \* \* \*